US011962624B2

(12) United States Patent
Kuehr-McLaren et al.

(10) Patent No.: US 11,962,624 B2
(45) Date of Patent: Apr. 16, 2024

(54) METADATA DRIVEN SELECTION OF ENTITLEMENTS IN AN IDENTITY GOVERNANCE SYSTEM

(71) Applicant: International Business Machines Corporation, Armonk, NY (US)

(72) Inventors: David Kuehr-McLaren, Apex, NC (US); Gabriel C. Rebane, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/586,327

(22) Filed: Sep. 27, 2019

(65) Prior Publication Data

US 2021/0099494 A1  Apr. 1, 2021

(51) Int. Cl.
*H04L 9/40* (2022.01)

(52) U.S. Cl.
CPC ........ *H04L 63/205* (2013.01); *H04L 63/0263* (2013.01); *H04L 63/102* (2013.01)

(58) Field of Classification Search
CPC .. H04L 63/205; H04L 63/0263; H04L 63/102
See application file for complete search history.

(56) References Cited

U.S. PATENT DOCUMENTS

| 10,915,652 | B1* | 2/2021 | Southerland | ............ | H04L 63/20 |
| 2006/0235714 | A1* | 10/2006 | Adinolfi | ................ | G06Q 40/06 |
| | | | | | 705/1.1 |
| 2006/0247944 | A1* | 11/2006 | Calusinski | ............. | G06Q 40/00 |
| | | | | | 705/1.1 |
| 2008/0052102 | A1* | 2/2008 | Taneja | ................. | G06Q 10/103 |
| | | | | | 705/7.11 |
| 2009/0150981 | A1* | 6/2009 | Amies | ..................... | H04L 67/02 |
| | | | | | 726/5 |

(Continued)

OTHER PUBLICATIONS

Sailpoint, "IdentityIQ" Product Brochure, Copyright 2014.

(Continued)

*Primary Examiner* — Jason Chiang
(74) *Attorney, Agent, or Firm* — Anthony M. Pallone

(57) ABSTRACT

An identity governance system that automates launching of identity campaigns (e.g., attestation, certification, etc.) is augmented to provide for the more efficient generation of datasets that are to be evaluated in a particular campaign review. To this end, at least one data model supported in the system is extended to support user- or system-defined metadata that, once populated with data, enable the system to generate campaign datasets from various data sources in an automated, efficient manner. Metadata includes, for example, application properties, entitlement properties, and the like. In lieu of maintaining a list of entitlements manually, an administrator defines metadata that should be associated with various datasets, e.g., for each application, entitlement, organization unit, etc. When time to generate a campaign dataset, the system examines the underlying data sources (that are extended via the metadata) to enable automated generation of a campaign dataset that includes the relevant metadata information.

18 Claims, 12 Drawing Sheets

(56) References Cited

U.S. PATENT DOCUMENTS

| | | | |
|---|---|---|---|
| 2009/0328132 A1* | 12/2009 | Renfro | G06F 21/577 |
| | | | 726/1 |
| 2010/0281513 A1* | 11/2010 | Richards | G06F 21/604 |
| | | | 726/1 |
| 2011/0307957 A1* | 12/2011 | Barcelo | G06F 21/577 |
| | | | 726/25 |
| 2012/0216244 A1 | 8/2012 | Kumar et al. | |
| 2012/0317648 A1* | 12/2012 | Brown | H04L 63/20 |
| | | | 726/26 |
| 2013/0067538 A1* | 3/2013 | Dharmarajan | G06F 21/45 |
| | | | 726/4 |
| 2014/0075492 A1* | 3/2014 | Kapadia | H04L 63/102 |
| | | | 726/1 |
| 2014/0181912 A1* | 6/2014 | Kling | H04L 63/1425 |
| | | | 726/4 |
| 2015/0318986 A1 | 11/2015 | Novak et al. | |
| 2017/0093872 A1* | 3/2017 | Braksator | H04L 63/20 |
| 2017/0317833 A1 | 11/2017 | Smith et al. | |
| 2018/0089601 A1* | 3/2018 | Link | G06F 40/205 |
| 2018/0253669 A1* | 9/2018 | Thunoli | G06Q 10/067 |
| 2018/0329964 A1* | 11/2018 | Tolani | G06F 16/2457 |
| 2019/0095840 A1* | 3/2019 | Riguera Arias | H04L 67/1097 |
| 2019/0251274 A1* | 8/2019 | Wang | H04L 63/1433 |
| 2019/0260752 A1* | 8/2019 | Thexton | H04L 63/102 |
| 2019/0266143 A1* | 8/2019 | Pandya | G06F 11/3688 |
| 2019/0334912 A1* | 10/2019 | Sloane | G06F 16/23 |
| 2020/0106781 A1* | 4/2020 | Li | G06F 21/629 |
| 2020/0274880 A1* | 8/2020 | Badawy | H04L 63/102 |
| 2020/0322342 A1* | 10/2020 | Gokhale | H04L 63/102 |
| 2020/0358778 A1* | 11/2020 | Gopinathapai | G06F 16/2246 |

OTHER PUBLICATIONS

Gurucul, "Discover Privileged Accounts with Entitlement Classification," available at: https://gurucul.com/blog/discover-privileged-accounts-with-entitlement-classification, 2019.

Oracle, "Oracle Waveset 8.1.1 Business Administrator's Guide: Periodic Access Reviews and Attestation," available at https://docs.oracle.com/cd/E19225-01/821-0094/6nl60ainv/index.html, Copyright 2010.

IBM, "IBM Security Identity Governance and Intelligence, Version 5.2," available at https://www.ibm.com/support/knowledgecenter/en/SSGHJR_5.2.0/com.ibm.igi.doc/CrossIdeas_Topics/AC/EntitlementReview.html, Copyright 2015.

Symantec, "Entitlement Review," available at https://sort.veritas.com/public/documents/SDI/5.0/windows/productguides/html/sdi_user/sdi_ref_entitlement_review.htm, Copyright 2005.

* cited by examiner

METADATA DRIVEN SELECTION OF ENTITLEMENTS IN AN IDENTITY GOVERNANCE SYSTEM

BACKGROUND

Technical Field

This disclosure relates generally to the field of digital resource access, and more particularly to managing user entitlements by which users access protected resources.

Background of the Related Art

Identity and Access Management Governance is a set of processes and policies for organizations to manage risks and maintain compliance with regulations and policies by administering, securing, and monitoring identities and their access to applications, information, and systems. Although potentially complex in implementation, the concept of Identity and Access Management (IAM) Governance is fairly straightforward: determine who should have access to what resources and who should not, according to government regulations, industry-specific regulations (SOX, HIPPA, GLBA, etc.), and business regulations and guidelines. Typically, key aspects of IAM Governance include access request governance, entitlement certifications, reports and audits, and analytics and intelligence (including role management, entitlement management, separation of duties enforcement, and privileged identity management). An end-to-end IAM Governance solution may also provide related functions, such as access enforcement, user provisioning, password management, and user lifecycle management.

Identity and access management (IAM) systems protect enterprise data and applications with context-based access control, security policy enforcement and business-driven identity governance. These systems may be operated in a standalone manner, in association with cloud-based environments, or in hybrid environments.

Regulations and corporate policy require regular review and certification of access to application and systems. This is usually done in periodic user access certification campaigns where supervisors managing users with a need to access a system are provided a list of users and their access to sensitive systems and to specific entitlements on those systems. The supervisor must approve continued access to systems at the appropriate level and revoke inappropriate access and access that is no longer needed. Although in principle the above-described workflow is straightforward, it is very difficult to build and maintain the list of entitlements that need to be reviewed as well as to best determine how often they need to be reviewed (e.g., yearly for general access, quarterly for administrative, etc.). For example, a particular certification campaign may need to include all the entitlements from several applications, a subset of entitlements from another group of application, group memberships from a directory indirectly associated to a third set of application, and so forth. In addition, the entitlements that need to be reviewed in any given campaign often change, e.g., as new applications are added, as applications and entitlements change regulatory classification, and entitlements are added/modified/removed from applications and registries. Maintaining the correct set of entitlements that need to be in the various periodic campaigns is very time consuming and error prone, often leading to audit failures. Because of this difficulty, an alternative approach simply is to include all possible entitlements to guarantee coverage, but this is overwhelming to the reviewer and leads to "rubber stamping" access, which also poses the risk of audit failure.

There remains a need to provide improved automated techniques for managing entitlement selection to facilitate identity governance, such as attestation and certification. The techniques herein address this need.

BRIEF SUMMARY

According to this disclosure, an identity governance system that automates launching of identity campaigns (e.g., attestation, certification, etc.) is augmented to provide for the more efficient generation of datasets that are to be evaluated in a particular campaign review. To this end, one or more data models supported in the system are extended to support user- or system-defined metadata that, once populated with data, enable the system to generate campaign datasets from various data sources in an automated, efficient manner. Metadata includes, for example, application properties, entitlement properties, and the like. In lieu of maintaining a large list of entitlements manually, an administrator simply defines metadata that should be associated with various datasets, e.g., for each application, entitlement, organization unit, etc. When it comes time to generate a campaign dataset, the system examines the underlying data sources (that are extended via the metadata) to enable automated generation of a campaign dataset that includes the relevant metadata information. The metadata may be stored in the system automating the certification, or stored externally in another system, e.g., a change control and management database.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
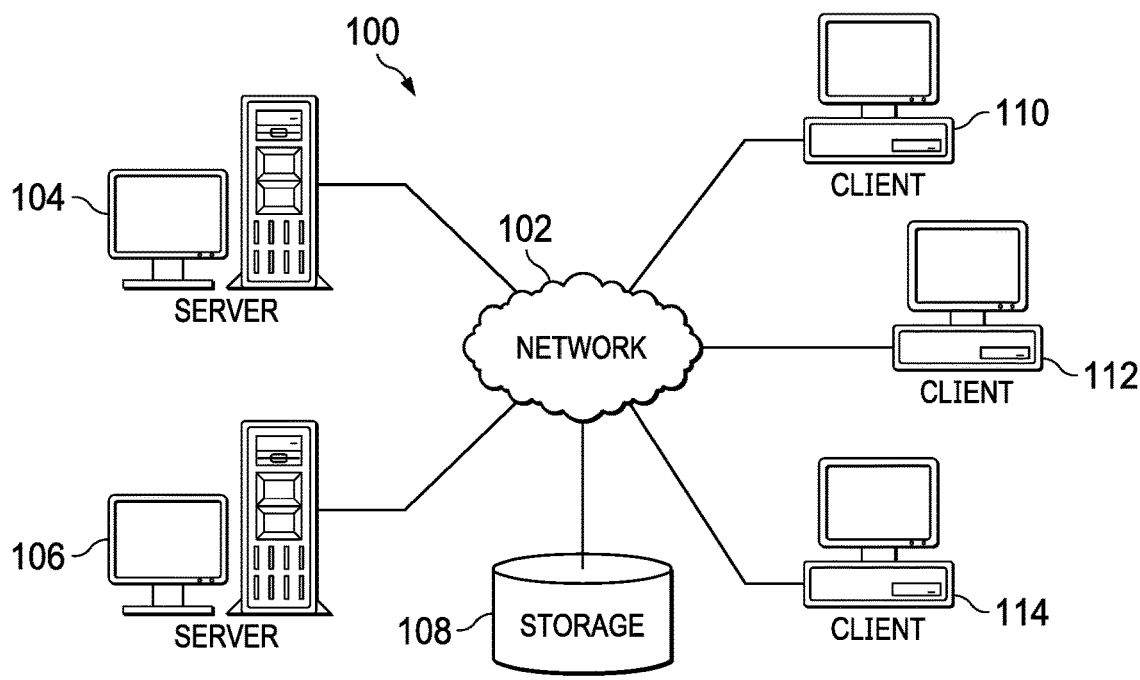
FIG. 1 depicts an exemplary block diagram of a distributed data processing environment in which exemplary aspects of the illustrative embodiments may be implemented.
Figure 2:
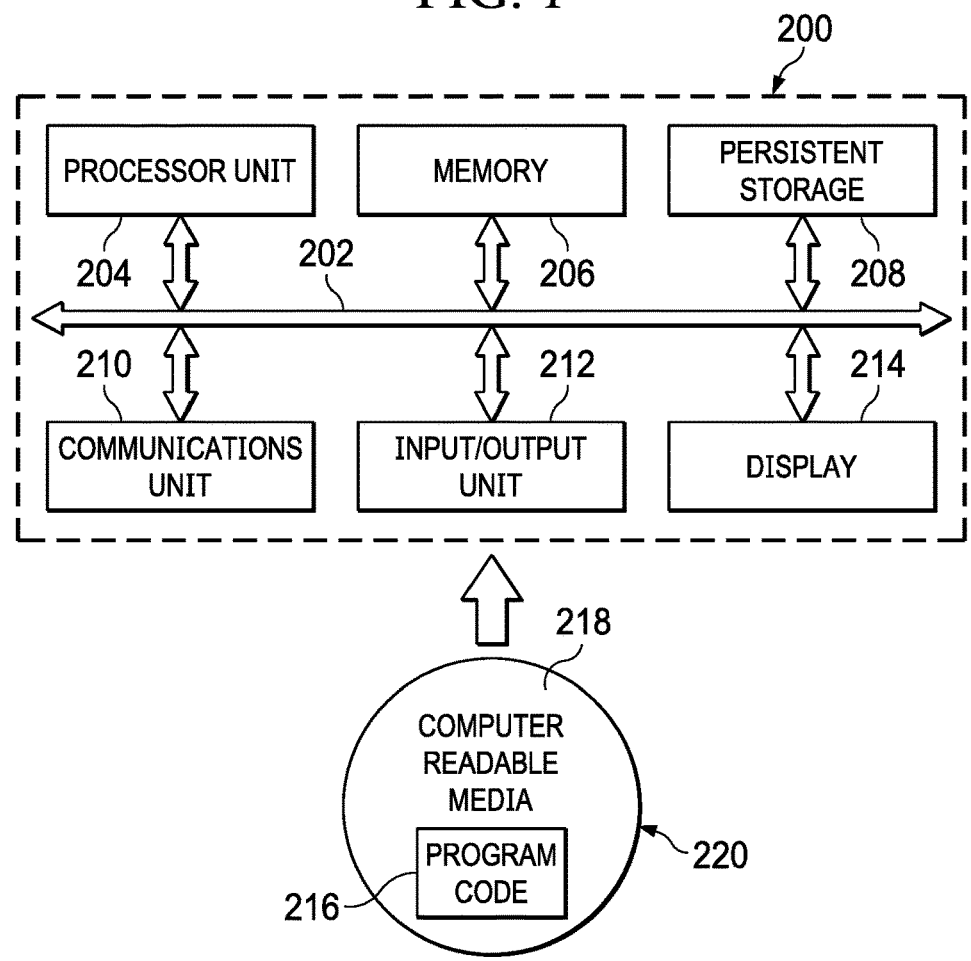
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Identity and Access Management

As used herein, an "account" typically refers to an entity that contains a set of parameters that define application-specific attributes of a principal, which include the identity, user profile, and credentials.

"Access" refers the ability to read, update, delete, or otherwise use a resource. Access to protected resources is typically controlled by system software.

A "credential" refers to a declaration of authorization or other security attributes of a subject that is typically validated and signed by a trusted third party. Typically, a credential represents the ID and authenticators (such as a password) for a resource.

An "entitlement" refers to a capability-based reason that a user is given a permission or set of permissions to access IT resources (services). An entitlement is any construct that grants a user a level of access to an application or a system. This includes, without limitation, groups, ACLs, IT roles, application roles, and business roles.

An "identity" refers to a subset of profile data that uniquely represents a person or entity and that is stored in one or more repositories.

An "ownership type" refers to a category that classifies ownership accounts. One account preferably can have only one type of ownership. Accounts can be marked with different ownership types depending on their use. Default ownership types include, for example, device, personal, system, and vendor.

A "person" is an individual in the system that has a person record in one or more corporate directories.

A "policy" is a set of considerations that influence the behavior of a managed resource or a user.

A "principal" is a person or group that has been granted permissions. It also refers to an entity that can communicate securely with another entity.

A "recertification" refers to the process of validating and possibly updating credentials with a system, typically after a specified time interval. A "recertification policy" refers to a policy that defines the life cycle rule for automatically validating accounts and users in a provisioning system at a specified frequency. The policy sends approvals to the recertification policy participants asking if the accounts or users are still to be certified.

In identity management, "provisioning" refers to the process of providing, deploying, and tracking a service or component. To "provision" means to set up and maintain the access of a user to a system, or to create an account on a managed resource.

A "provisioning policy" is a policy that defines the access to various managed resources (services), such as applications or operating systems. Access is granted to all users, users with a specific role, or users who are not members of a specific role.

A "resource" is a hardware, software, or data entity.

A "role" is a logical group of principals that provide a set of permissions. Access to resources is controlled by using provisioning policy to grant access to a role. A role can also represent a group of principals based on business job title or other business-related attributes.

A "service" is a representation of a managed resource, application, database, or system. In an identity management system, typically a service represents the user repository for a managed resource.

A "user" is an individual, organization, process, device, program, protocol, or system that uses the services of a computing system. For example, a user is an individual who uses the identity management system to manage their accounts and passwords, or that is managed by the system.

A "user recertification policy" is a policy that provides a periodic re-validation process for a user's role memberships, accounts, and group membership of accounts. Typically, user recertification combines recertification of multiple resources and memberships into a single activity to be completed by a designated approver.

For many applications, networks, databases and other resources, users are given "access" by an authority or administrative role to enable activity associated with the resource. The conditions and limitations of the access for a given user are referred to as the "access entitlement" of the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative area that utilizes a system to identify individuals with membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered, however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades. In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

It is known in the prior art to provide software and services to deploy policy-based provisioning solutions. These solutions help companies automate the process of provisioning employees, contractors, and business partners with access rights to the applications they need, whether in a closed enterprise environment or across a virtual or extended enterprise. A known product of this type is IBM® Security Identity Manager.

Figure 3:
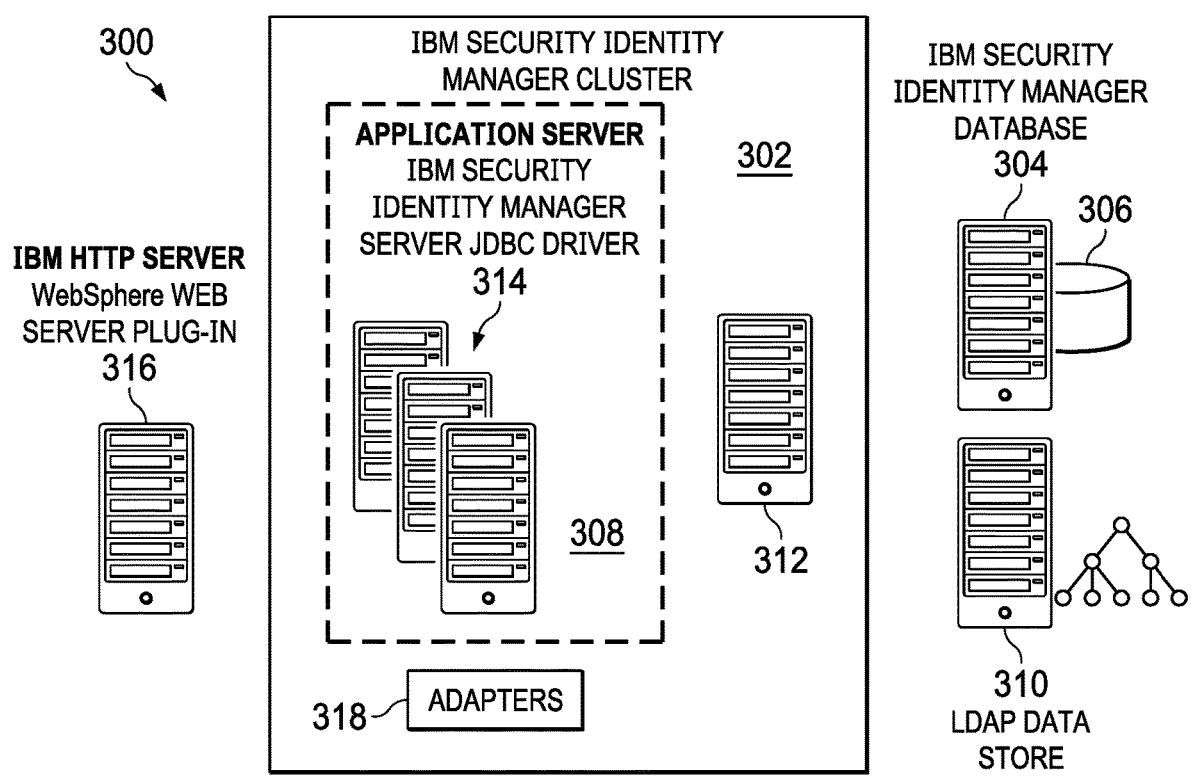
FIG. 3 is a representative security identity management system in which the disclosed subject matter may be implemented.

FIG. 3 is a block diagram of this commercially-available identity manager solution. In one embodiment, as will be described, the techniques of this disclosure may be implemented in such a solution. This identity manager solution, however, is merely representative and should not be taken to limit this disclosure. The representative commercial implementation is known as IBM® Security Identity Manager, Version 6.0. That product manages the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. As will be described in more detail below, the solution also affords the ability to add approvals for user requests to access requests. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity driver (JDBC driver) 308. For example, a JDBC driver enables an IBM Security Identity Manager Server to communicate with a data source. IBM Security Identity Manager supports a JDBC type 4 driver to connect a Java-based application to a database. The supported database products are IBM DB2® Database, Oracle DB, and MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server. The solution also preferably includes a directory integrator 312, such as IBM Tivoli Directory Integrator, to synchronize identity data in different directories, databases, and applications. IBM Tivoli Directory Integrator synchronizes and manages information exchanges between applications or directory sources. The solution also includes one or more application servers 314, such as IBM WebSphere® Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager that manages the cluster. The solution also typically includes an HTTP server and WebSphere Web Server plug-in 316. An HTTP server provides administration of IBM Security Identity Manager through a client interface in a web browser. Finally, the solution typically includes one or more IBM Security Identity Manager adapters 318. An adapter is a program that provides an interface between a managed resource and the IBM Security Identity Manager Server. Adapters function as trusted virtual administrators on the target platform for account management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution of this type also may be implemented in whole or in part in a cloud-based solution.

Figure 4:
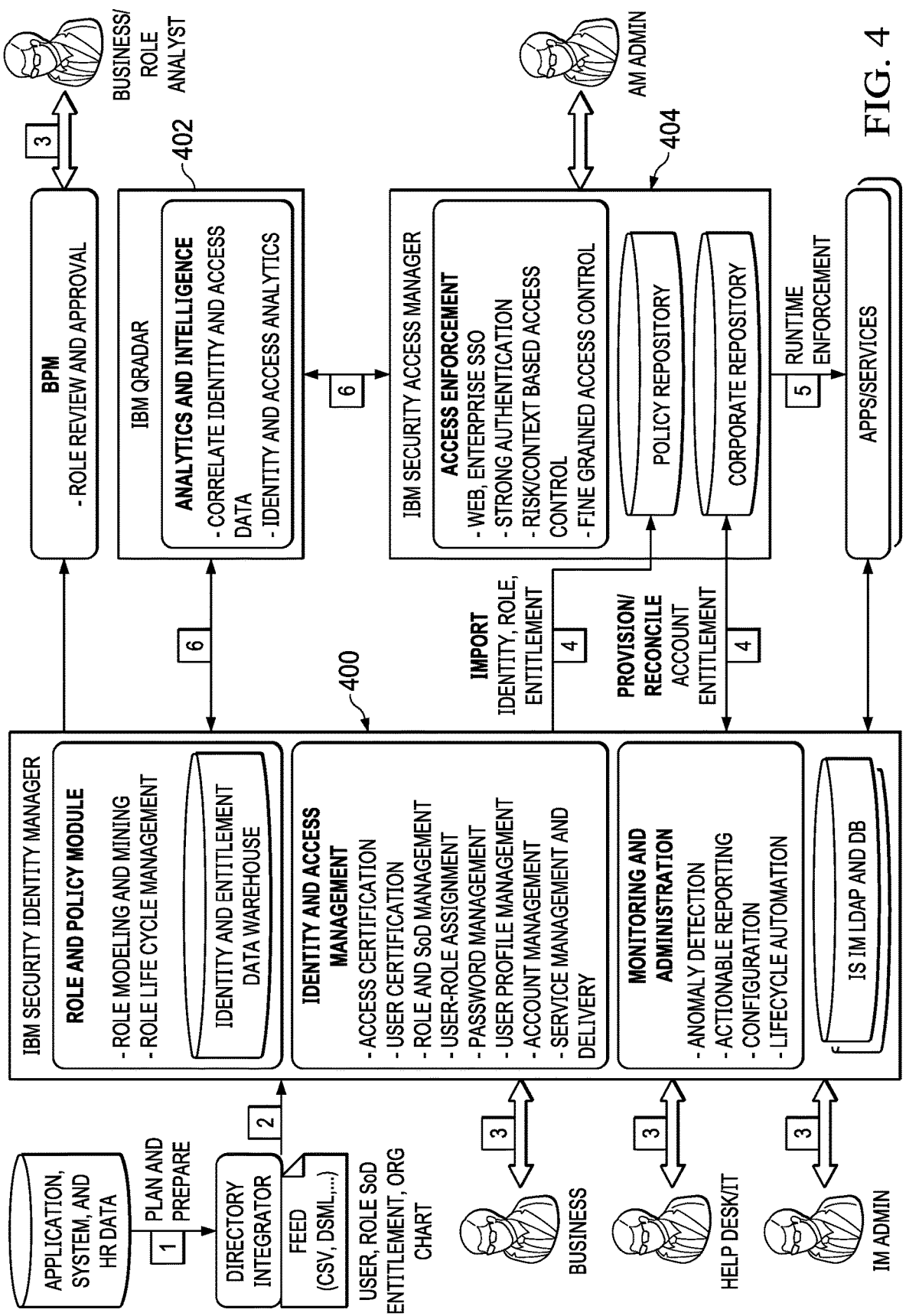
FIG. 4 illustrates a step-by step-guide for implementing IAM governance using an Identity and Access Management system.

FIG. 4 illustrates a representative step-by step-guide for implementing IAM governance using an Identity and Access Management system 400 such as IBM Security Identity Manager. In this embodiment, an end-to-end solution is provided in association with several other systems including a Security Information and Event Management (SIEM) software system 402 (e.g., IBM QRadar®), and an access and entitlement enforcement system (e.g., IBM® Security Access Manager) 404.

At step (1), the enterprise identifies the resources that it wants protected and the accesses it wants certified and monitored. The data is cleaned, filtered, and prepared for loading into the Identity and Access Management system 400 through TDI, LDAP Feed, flat files (CSV, DSML, etc.), or API. At step (2), the data may be loaded into a role and policy module 402 for modeling and management. This data can come from various sources: Human Resources (HR), a planning and modeling tool, or manual entry. In a typical use case, the data gathered during planning is saved (e.g., in a standard CSV file) and then imported into IBM Security Identity Manager for role and policy modeling. The system can export the modeled role and entitlement data (e.g., in XML format) and load it for lifecycle management and certification. At step (3), stakeholders and participants can use the Identity and Access Management system 400 for the various tasks that they must perform, such as requesting accesses and roles, approving access and role requests, certifying, managing, and modeling roles, and reviewing and certifying roles and entitlements. The certification data can be used to clean, adapt, and evolve the system. As step (4), the access and entitlement enforcement system 404 imports or provisions the data from Identity and Access management system 400 into the access and entitlement enforcement systems. At step (5), the enforcement system 404 uses the certified data for runtime enforcement. The SIEM system 402 monitors actual user activity and provides feedback to fine-tune access policy planning, administration, and enforcement.

As illustrated in FIG. 4, one of the responsibilities of the Identity and Access Management system 400 is to provide initial and periodic access certification for continued business needs to help direct and control operations. Access certification typically includes review and certification of user access assignment via role or direct assignment to determine who received access to what, when, and why. It ensures that users have only the privileges and exception entitlements they need to perform their job. Access certification can also be used to detect policy violations, access anomalies, and orphan and dormant accounts. The IAM system typically also maintains certification and access change history, which aids the certification and audit processes.

The system also supports the notion of user to role recertification and user to access recertification according to a recertification policy. Recertification policy simplifies and automates the process of periodically revalidating a target type (account or access) or a membership (role or resource group). Depending on the business needs and the risk level of protected resources, organizations can set a suitable period to perform the scheduled access certification. They can also kick off a certification campaign that is based on-demand or on an event, such as a management event or anomaly detection. The process sends recertification notification (e.g., CBN) and approval events to the participants. A recertification policy includes activities to ensure that users provide confirmation that they have a valid, ongoing need for a specified resource or membership. Typically, the recertification policy also defines the operation that occurs if the recipient declines or does not respond to the recertification request. Recertification policies use a set of notifications to initiate workflow activities in the recertification process. For example, a system administrator of a specific service can create a recertification policy for the service that sets a 90-day interval for account recertification. If the recipient of the recertification declines recertification, the account can be automatically suspended. During the certification process, the system can do bulk or selective certification. For a time-critical certification, the system may provide options to automatically escalate or delegate the action item to an alternate user when timely action is not taken.

Preferably, the system enables certifiers can preview the impact of the certification before submitting it to see if any roles, accounts, or groups are affected by the access decision. Approval and recertification policies deliver change control at the user, role, and access level. Without substantially impacting the business, the change control process can consume any change to the business that affects the user, role, and access structure.

Identity Governance and Intelligence

Figure 5:
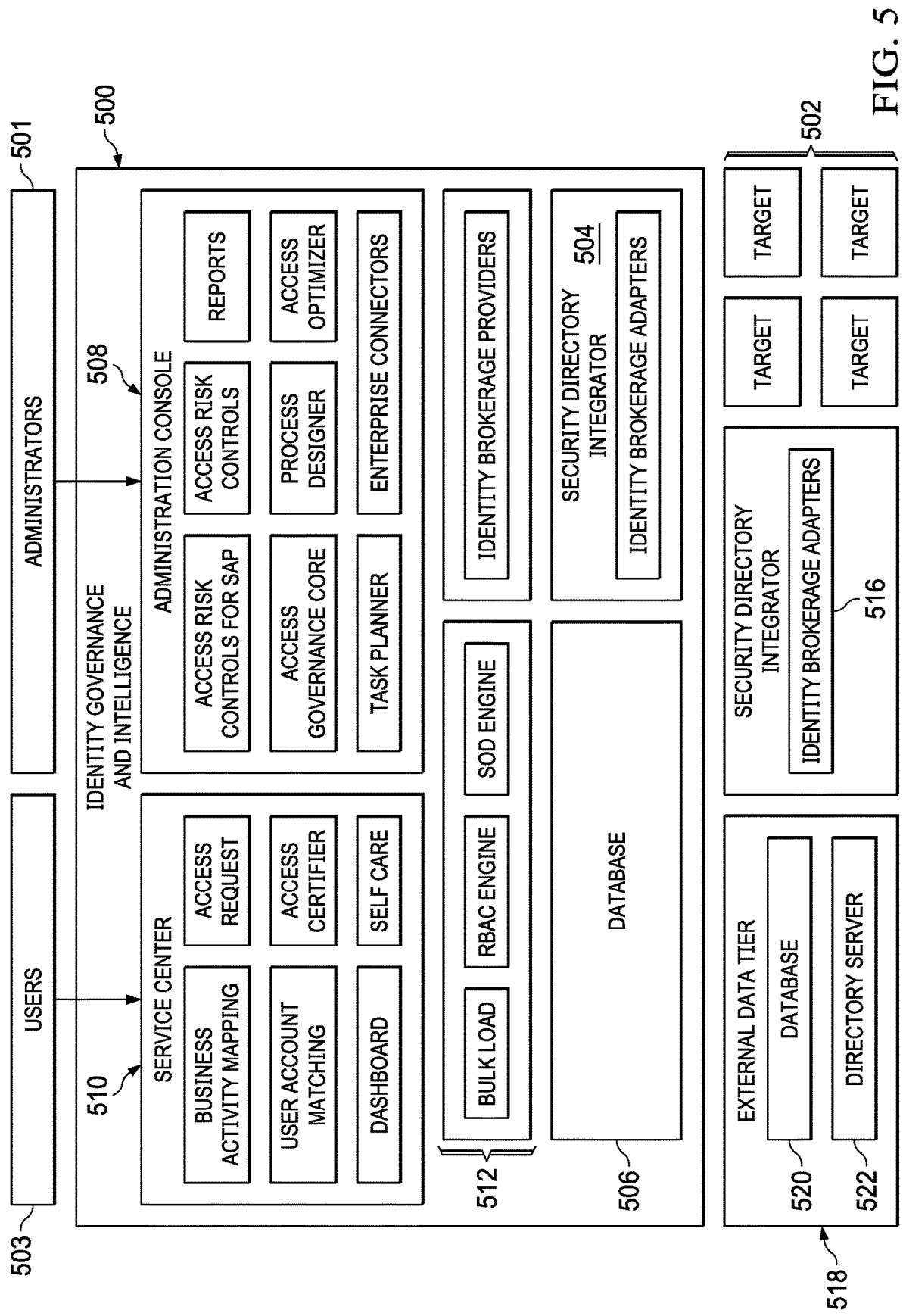
FIG. 5 depicts a representative Identity Governance and Intelligence (IGI) system in which the technique of this disclosure may be implemented.

FIG. 5 depicts a representative commercially-available Identity Governance and Intelligence (IGI) system 500 in which the techniques of this disclosure may be implemented. For example, IBM® Security Identity Governance and Intelligence is a network appliance-based integrated identity governance solution. It is designed to retrieve and manage data from multiple targets 502 through a set of modules, a security directory integrator 504, and a database 506. IGI has several access points, which contain the different modules intended for IGI administrators 501 and business users 503. These modules are an administrative console 508, and a service center 510. An identity brokerage component 512 is a gateway to directly integrate identity governance and intelligence with targets 502 and other hubs, e.g., using IBM Security Identity Adapters 514. The security directory integrator is built-in to the IGI virtual appliance and, as depicted, multiple instances of it can be installed and configured. Preferably, the security directory integrator 504 is pre-configured with a set of identity brokerage adapters 516 (e.g., AIX®, LDAP, Linux, Solaris, etc.) IGI-supported adapters preferably are installed externally on the virtual appliance. As also depicted, an IGI external data tier 518 is composed of various entities, which are stored in the database server 520 and directory server 522. The database server 520 contains data entities, namely, an IGI data store, and an identity brokerage data store. The directory server 522 stores other data entities, such as target configuration, and target cache, which are used by the identity brokerage when processing change requests.

IGI 500 supports a database model that is patterned on how an organization is structured in terms of different entities that are registered in the organization, links and relationships between and among those entities, and sets of application policies and processes that the organization uses to manage those entities. Typically, IGI consists of a core data model and an extended data model. The core data model contains elements (e.g., organization units, users, entitlements, resources, rights, applications, accounts, etc.) that define the organizational structure. The extended data model contains elements (e.g., business activities model and application permissions, risk definition and detection, segregation of duties (SoD), external SoD, risk mitigation, mitigation actions, domains, risk hierarchy, custom properties, etc.) that support risk definition and detection layer(s) of the identity governance and intelligence. Typically, identity governance is managed based on business requirements rather than, e.g., Information Technology (IT) processes; thus, users are classified by organizational roles, group membership, job activities, and access needs, not necessarily as individuals.

The identity governance and intelligence provided by the system include access governance, access risk assessment and management, access certification, audits and reports, access optimization, automated identity governance and control processes, workflow and policy management, entitlement management, target profile administration, password administration and management, persona-based dashboards, self-service features, and others.

The above-described commercial implementation is not intended to be limiting.

IBM Security Identity Governance and Intelligence can be used with other security products to deliver an integrated solution. These include IBM Security Identity Manager described above (FIG. 3), IBM Security Privileged Identity Manager, IBM Security Access Manager, IBM Security zSecure™ Manager, and others.

Metadata-Driven Selection of Entitlements Included in an Attestation Review and Certification With the above as background, the subject matter of this disclosure is now described. As has been described, an identity governance system (e.g., FIG. 5) that automates launching of identity campaigns (e.g., attestation, certification, etc.) is augmented to provide for the more efficient generation of datasets that are to be evaluated in a particular campaign review. To this end, one or more data models supported in the system are extended to support user-defined metadata that, once populated with data, enable the system to generate campaign datasets from various data sources in an automated, efficient manner. Thus, e.g., in the IGI system depicted in FIG. 5, the metadata is an element of the extended data model construct that is available natively in that system. The metadata may also be stored in a separate system and the extended model used to link the external system. As will be described, metadata includes, for example, application properties, entitlement properties, organizational unit properties, and the like. Once defined by a user (or perhaps by the system itself), metadata is used to determine the dataset that will compose a specific audit campaign. The approach here obviates maintaining a large list of entitlements manually; rather, and in a typical use case, an administrator simply defines metadata that should be associated with various datasets, e.g., for each application, entitlement, organization unit, etc. When it comes time to generate a campaign dataset, the system examines the underlying data sources (that are extended via the metadata) to enable automated generation of a campaign dataset that includes the relevant metadata information.

In this approach, metadata may be defined and maintained on an entitlement at many different levels throughout the governance system including, without limitation, application location, application regulatory classification, data classification of data managed by the application, entitlement regulatory classification, entitlement capability within an application (e.g., read versus write versus configure), entitlements granting elevated access, review cycle, and the like.

By enabling the user to define metadata information, e.g., for each entitlement, application or organization units, etc., a security management team can then define one or more audit campaigns based on their specific needs. For example, if an organization requires that only selected SOX (Sarbanes-Oxley) entitlements for multiple applications need to be included as part of a determined audit campaign, the user simply marks each entitlement or application with the corresponding metadata; the system then creates the custom audit campaign dataset based at least in part on the specified metadata. In this way, the management and definition of entitlements is delegated to application and business owners, and the accuracy of the campaign dataset for multiple campaign and audit types is improved.

Figure 6:
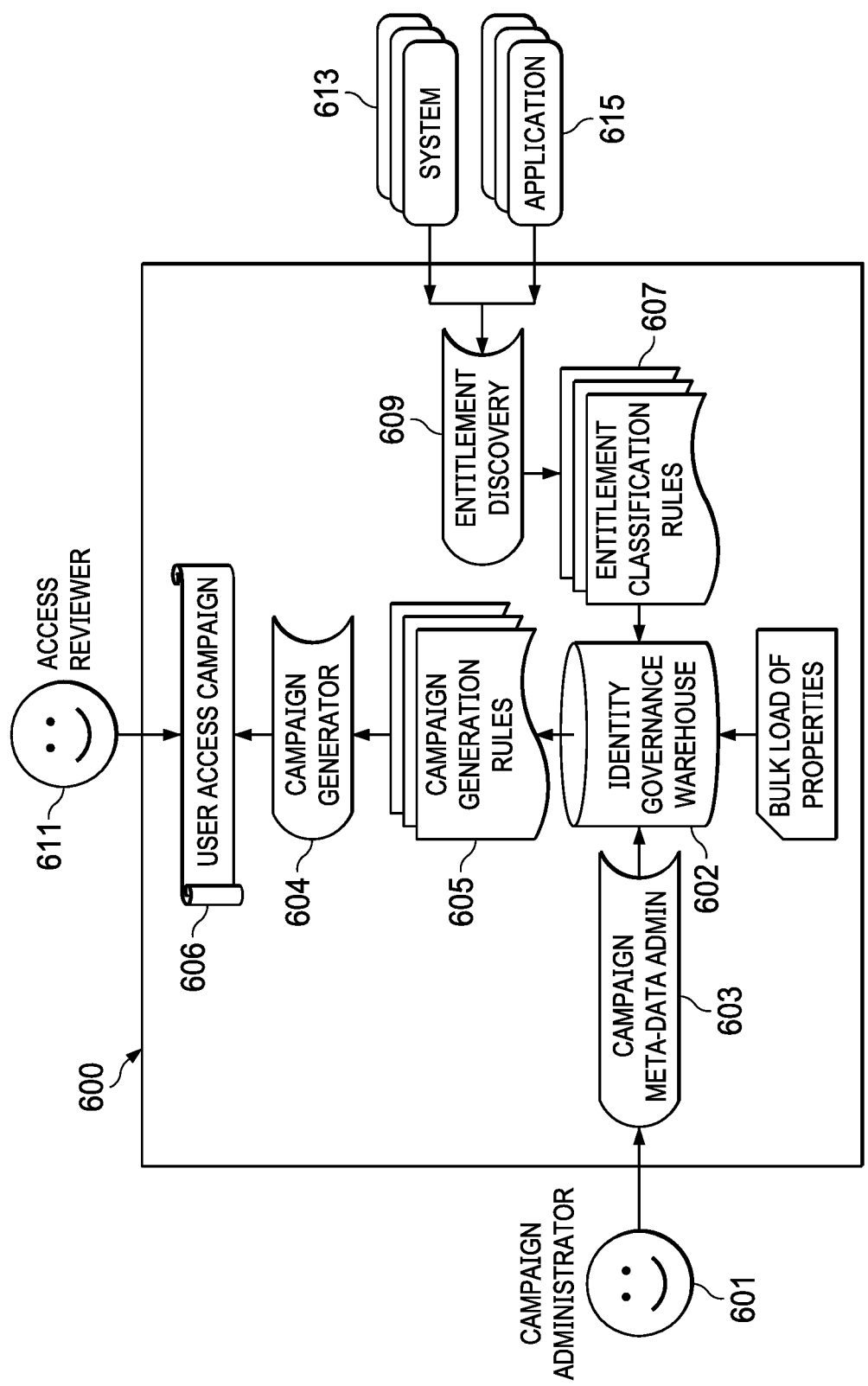
FIG. 6 depicts the IGI system in FIG. 5 that has been augmented to include the campaign metadata-driven selection support of this disclosure.

FIG. 6 depicts the basic technique of this disclosure. In one embodiment, the technique is implemented in a computing system, e.g., a system that provides identity governance and intelligence (IGI) such as described above. IGI system 600 comprises an identity governance data warehouse 602, and an automated campaign generator 604. The warehouse 602 contains application definitions, entitlements definitions for those applications, and what users have been assigned those entitlements, and other such data. An administrator 601 defines one or more access campaigns (that leverage the extensible metadata-driven) data modeling approach herein. The campaign generator outputs the access campaigns 606, which are designed to be consumed by the access reviewer 611. According to this disclosure, an access campaign 606 is generated at least in part based on an extensible data model (supported by warehouse 602) in which given data to be included in a campaign is defined by user-defined metadata. The system may provide default or reusable templates to facilitate this process, and particular templates may be uniquely associated to particular campaigns or compliance requirements. In a preferred embodiment, element 603 provides a tool (e.g., a web-based configurator) by which the campaign administrator 601 configures the metadata. Based on that configuration (as will be described below), relevant data stored or otherwise discoverable in the system is more readily discovered, retrieved and manipulated (processed by the campaign generator 604) as necessary to generate the user access campaign 606 dataset in an efficient, reliable and automated manner. As also depicted and as described above, the information stored in the warehouse 602 and which is mined by the campaign generator according to the metadata-extended data model receives data from various sources, including entitlement discovery 609, bulk load of properties 617, and so forth. Entitlement discovery obtains the relevant data from system resources 613 and application resources 615. During generation of the campaign, a set of entitlement/classification rules 607 (e.g., business rules) are applied to that permissions data that is selected on using the metadata defined.

As noted, and according to this disclosure the system 600 includes a data model that is extensible so that the campaign administrator 601 using tool 603 extends one or more data objects (e.g., applications, entitlements, organization units, etc.) with custom metadata. Using tool 603, the administrator extends the property on a data object with metadata, e.g., metadata that defines information of interest to the administrator (or the campaign). In the context of IBM® Identity Governance and Intelligence, the metadata is a "property." In the above-described commercial system, custom property extensions are enabled; in an alternative embodiment, e.g., where the native system does not have a way to extend the data objects with custom properties (or, more generally, the metadata), those extensions may be stored externally and then retrieved as needed by the campaign generator. For convenience, the following description assumes the preferred technique wherein the metadata extensions are supported natively in the data model of the system.

Figure 7:
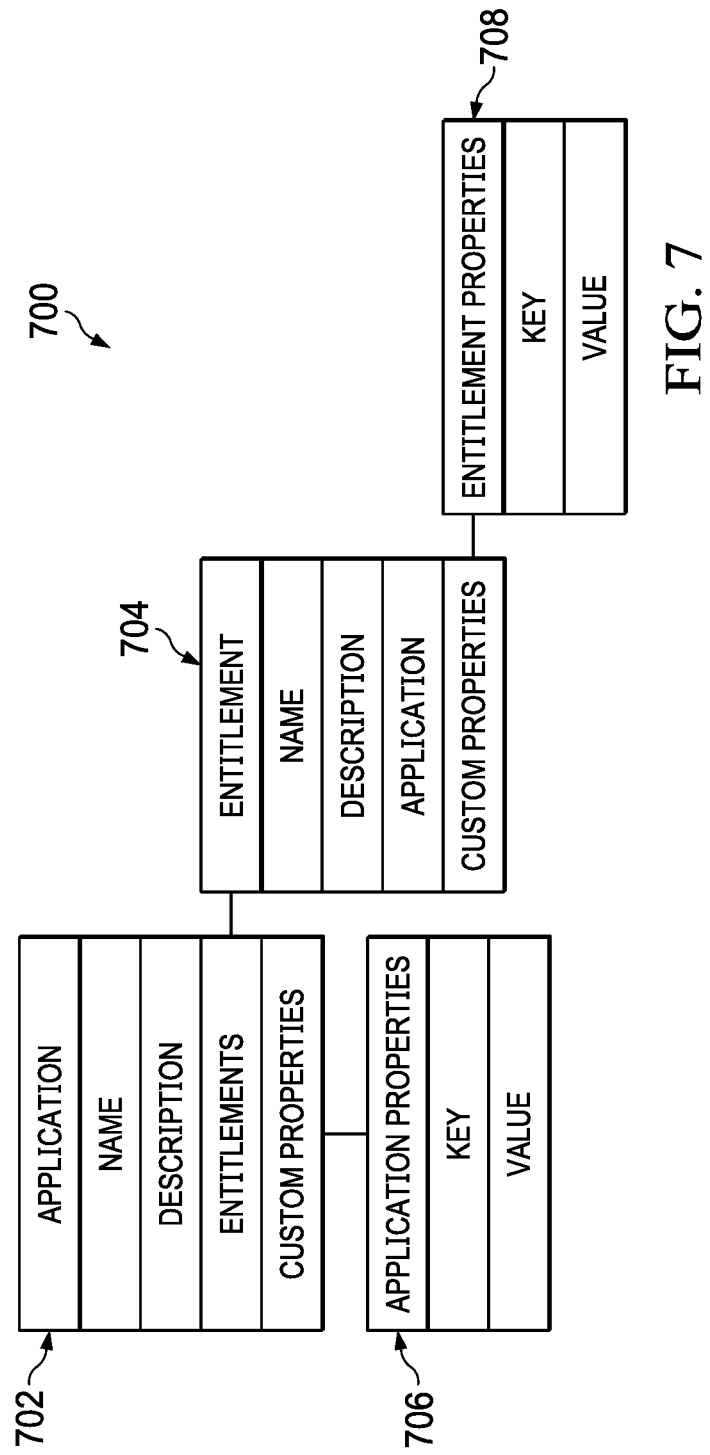
FIG. 7 depicts a data model that is extended to support custom metadata used to drive campaign generation according to this disclosure.

FIG. 7 depicts an exemplary object-oriented data model that supports metadata extensions according to this disclosure. As depicted, and in this example, the data model 700 includes various data object types, namely, Application data object 702, and Entitlement data object 704. The Application data object 702 comprises various elements, such as Name, Description and Entitlements, the latter element being then expressed in the Entitlement data object 704 as shown. As shown, in this example, both the Application and Entitlement data objects 702 and 704 have Custom Properties, which as further depicted are themselves data objects of the model 700. Thus, for example, Application Custom Properties are provided by the Application Properties data object 706, and the Entitlement Custom Properties are provided by the Entitlement Properties data object 708. As depicted, a Custom Property in a data object is defined by Key and Value elements. According to a preferred embodiment of this disclosure, the data model 700 is extended to support the metadata (namely, the additional data) that enables the dynamic creation of an auditable campaign dataset. By extending the data model in this manner, the campaign generator mines relevant data and build the campaign dataset more efficiently, thereby greatly enhancing the overall operational efficiency of the identity governance system.

Figure 8:
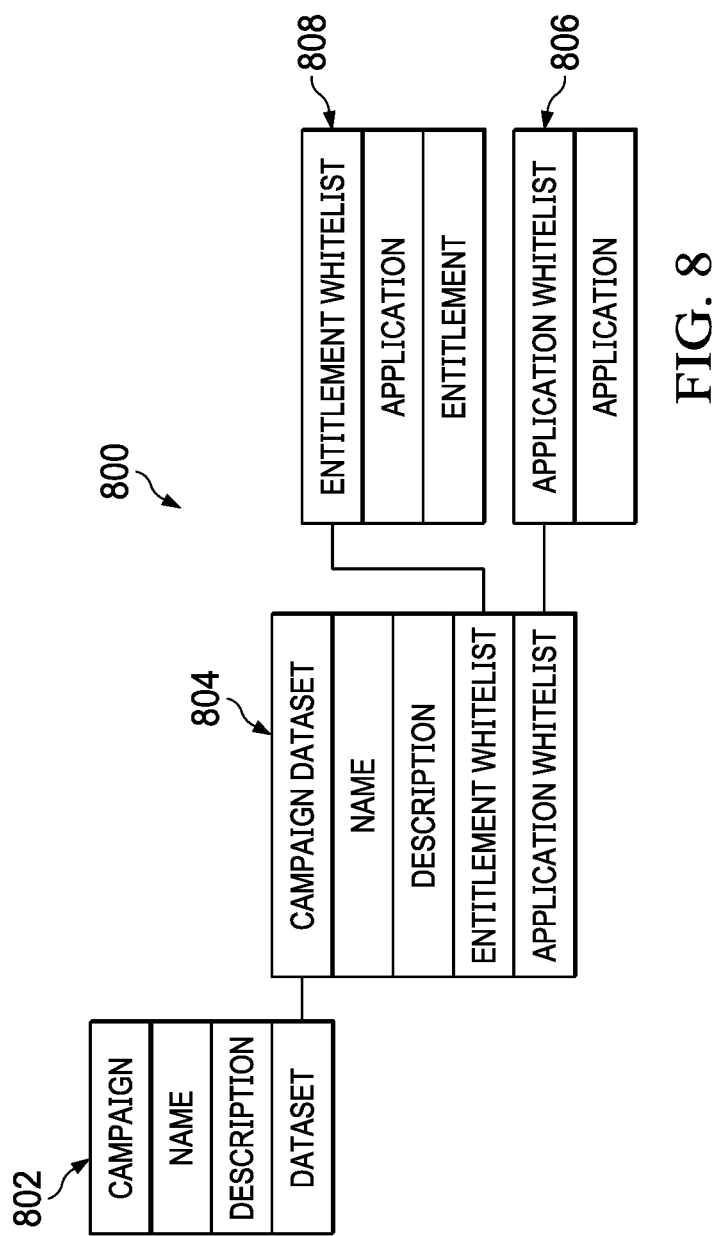
FIG. 8 depicts a data model for defining campaigns.

FIG. 8 depicts a data model for defining campaigns. Typically, the identity governance system contains a set of Campaigns that utilize Campaign Datasets to run a particular certification review. A Campaign Dataset contains a filter that is pattern-based or a list of entitlements, also known as a Whitelist. The data object relationships are depicted; typically, the data model 800 comprises a Campaign data object 802, the Campaign Dataset data object 804, the Application Whitelist 806, and the Entitlement Whitelist 808. As an example, assume there are two (2) applications: Wire Transfer, and Company Portal. It is further assumed that Wire Transfer is a financial application that is subject to two different compliance audits that occur at different frequencies by different auditors. For example, the ability to use the application to transfer money is regulated by SOX, and users with fund transfer access must be certified quarterly. Assume also that the administration of the application also falls under SOC2 audits and must be certified twice a year. Thus, and according to this disclosure, the extended properties for the entitlements of this application contain properties (metadata) that indicate the campaign required for each of the entitlements. The Company Portal, on the other hand, is an internal company website used by employees to access company information and applications. It is assumed that this application does not fall under an external audit requirement (e.g., SOX or SOC2), but assume further that it is the security policy of the company to review access to the portal for all users once a year. All entitlements are in the same campaign.

Figure 9A:
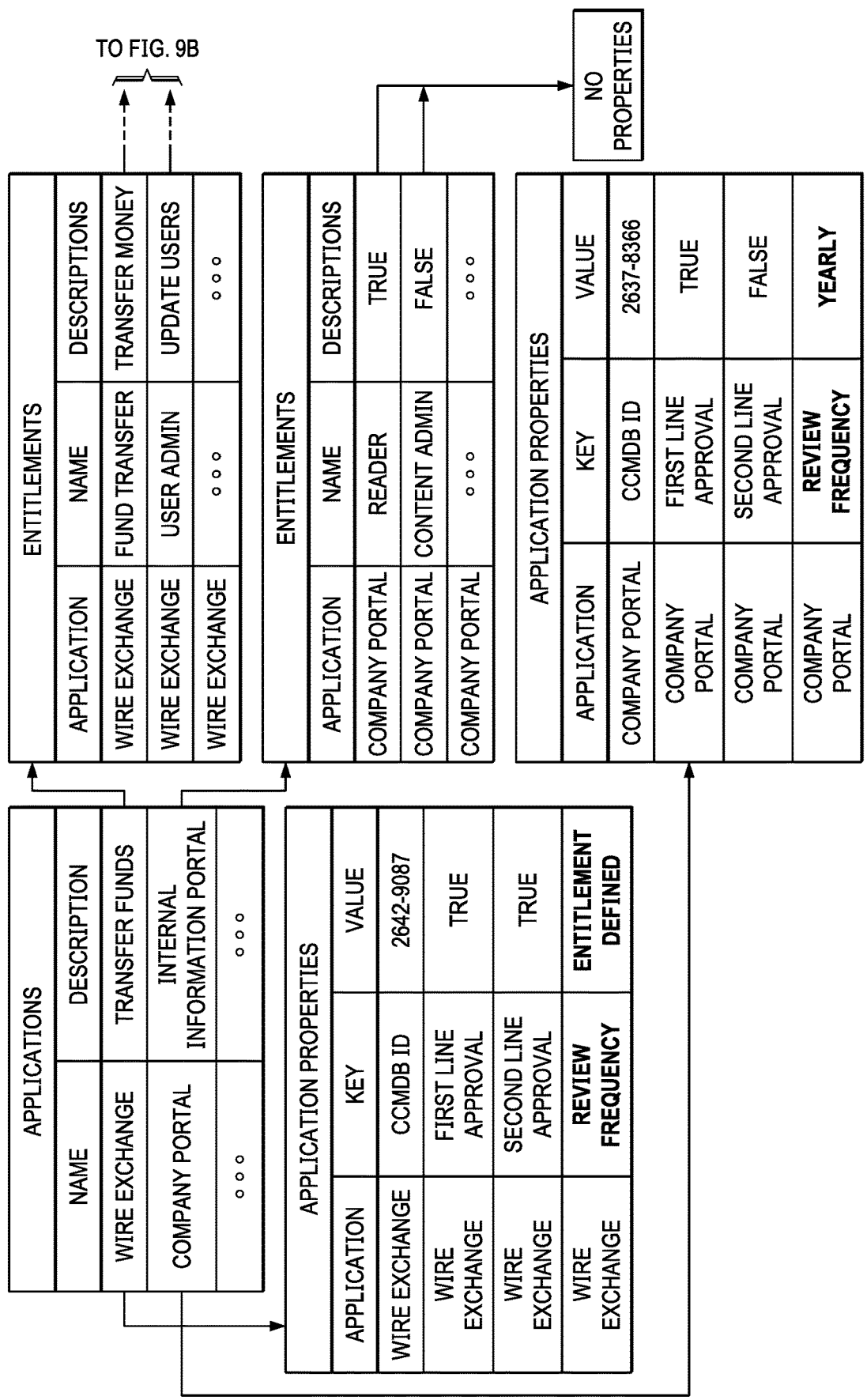
FIGS. 9A and 9B depict an example of how data may be represented in an IGI system data warehouse.
Figure 9B:
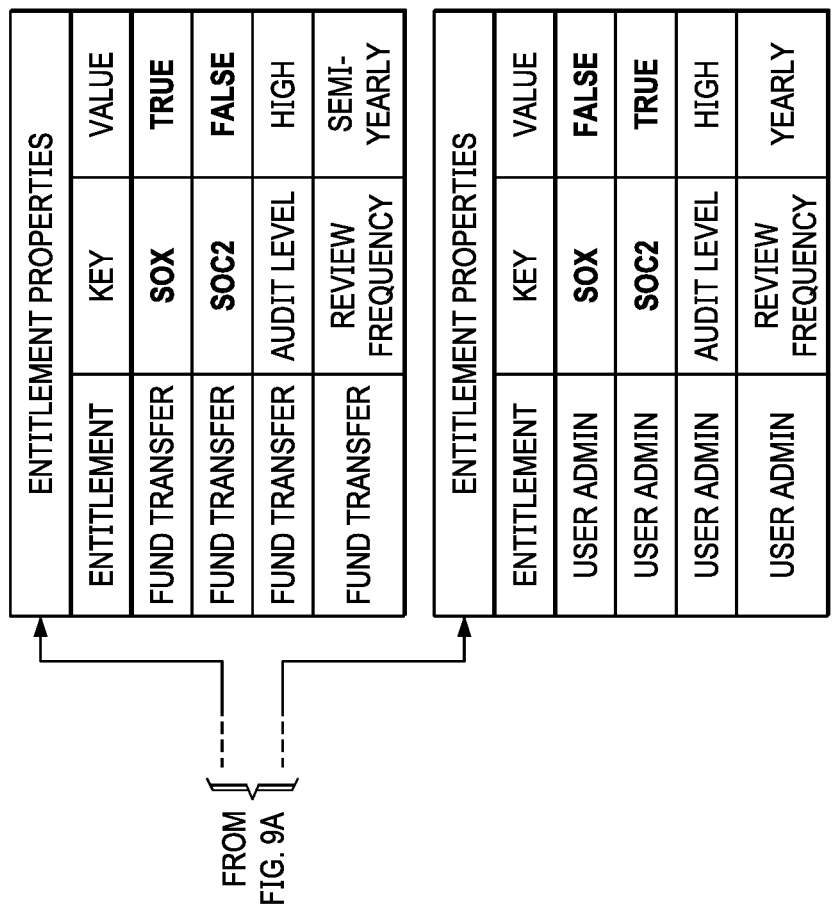

FIGS. 9A-9B depict an example of how data may be represented in an IGI system data warehouse for these two (2) applications.

As further applications and entitlements are added or changed (e.g., as regulations and security policies change), the governance administrator (e.g., FIG. 6, user 601) manually, or the system itself automatically, updates the data model, e.g., to set the application and entitlement properties.

Figure 10:
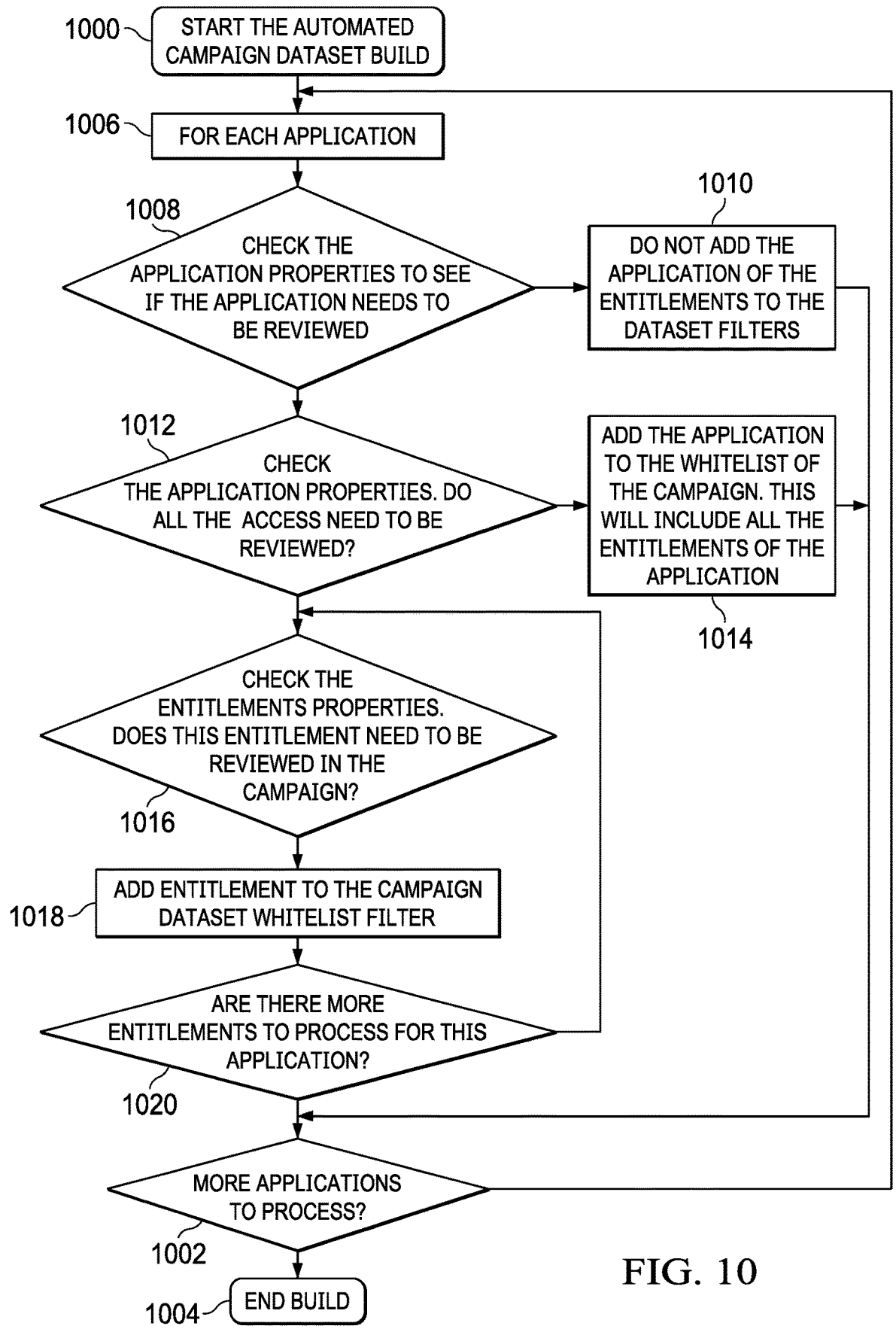
FIG. 10 depicts an automated process to dynamically and automatically build a campaign review dataset using metadata maintained as data model property extensions according to the technique of this disclosure.

FIG. 10 depicts an automated process to dynamically and automatically build a campaign review dataset using metadata maintained as data model property extensions according to the technique of this disclosure. The process begins at step 1000, wherein the system starts the automated campaign dataset building. Typically, the process iterates through each application, preferably as depicted. Thus, at step 1002, a test is performed to determine whether the build process is complete (i.e., whether there are more applications still to process). If not, the build is complete and the process ends at step 1004. If, however, there are additional applications, a next application is obtained (step 1006) and the follow-on processing is carried out for each such application. In particular, at step 1008, a test is performed to check the application properties (metadata) to determine if the application needs to reviewed (included in the build). If not, the routine branches to 1010, in which case neither the application nor its entitlements is added to the dataset filters; process control then returns to step 1002. If, however, the outcome of the test at step 1008 is positive, the routine continues at step 1012 to check the application properties (e.g., whether there is a continued access need, etc.). If the outcome of the step 1012 is negative, the routine branches to 1014, in which case the application is added to the whitelist of the campaign; this action also includes adding in all of the entitlements of the whitelisted application. Following step 1014, control returns to step 1002. If, however, the outcome of step 1012 is positive, the routine continues at step 1016 to check the entitlement properties on an entitlement-by-entitlement iterative basis (in other words, whether each particular entitlement needs to be reviewed in the campaign). If the outcome of the test at step 1016 is positive for a particular entitlement, the routine branches to step 1018 to add that entitlement to the campaign dataset whitelist filter. Thereafter, control passes to step 1020 to test whether additional entitlements remain to be processed for this application. If the result of the test at step 1020 is positive, control returns to step 1016; otherwise, control returns to step 1002. This completes the processing used to dynamically build the dataset.

Figure 11:
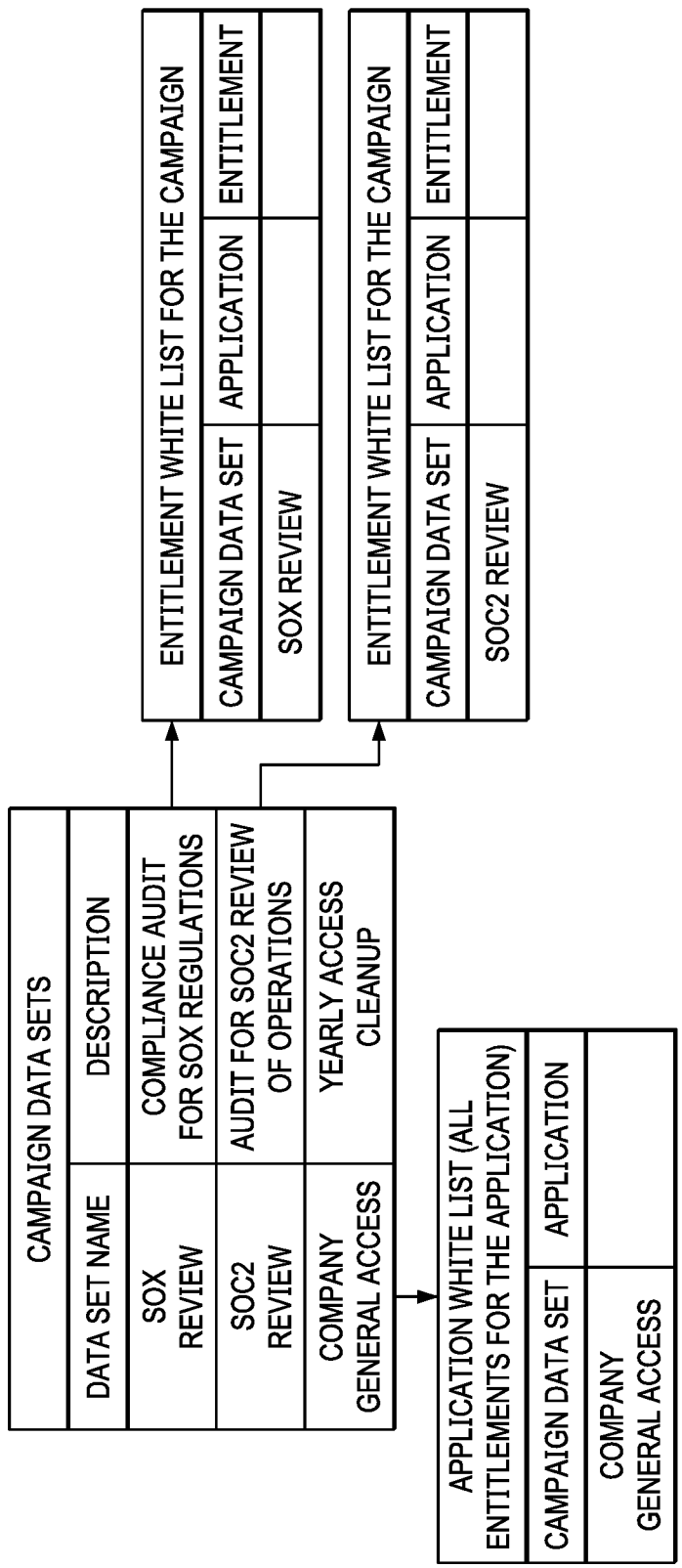
FIG. 11 depicts an example campaign dataset before execution of the process in FIG. 10.
Figure 12:
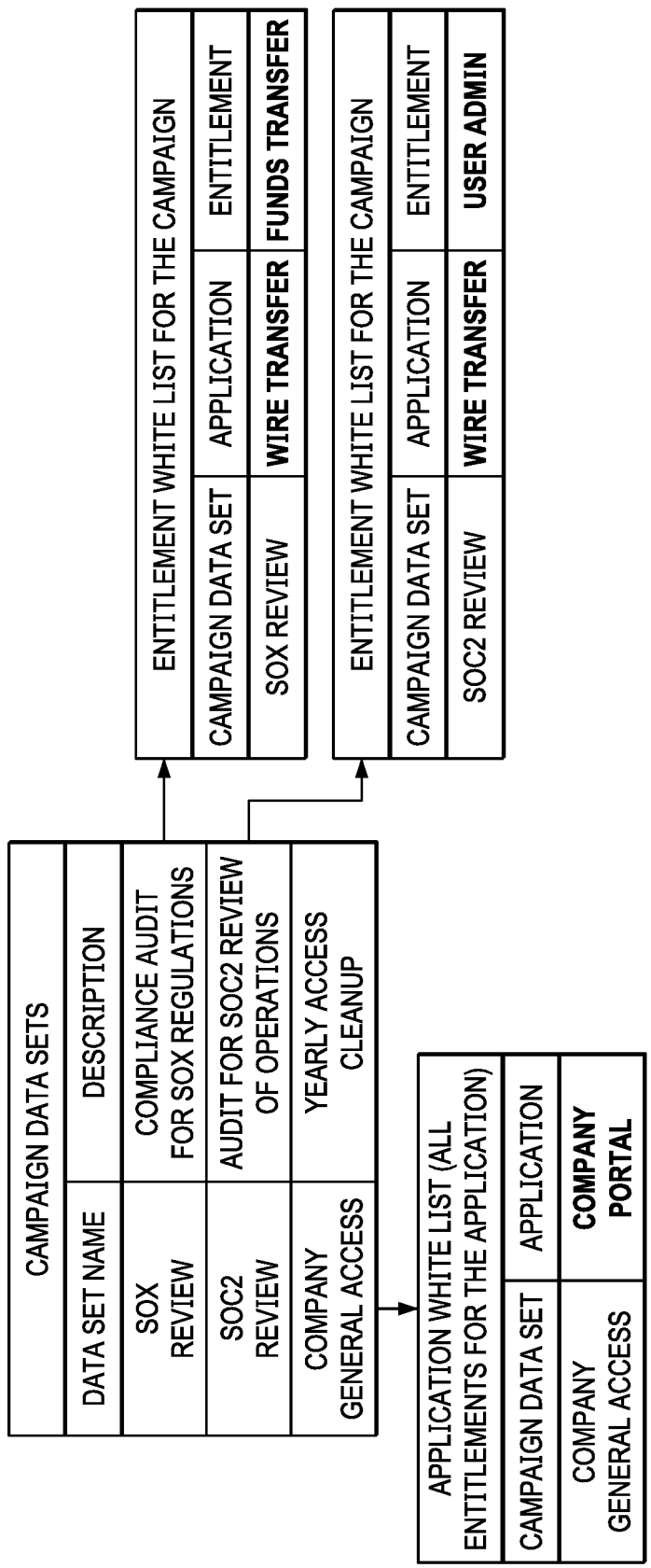
FIG. 12 depicts the campaign dataset after execution of the process in FIG. 10.

The above-described process may be optimized using database operations that select all the entitlements that meet campaign criteria. To provide a concrete example, FIG. 11 depicts an example campaign dataset before execution of the process in FIG. 10. As shown the campaign datasets are initially empty and contain no application or entitlement whitelist data. In this example, assume three (3) campaign datasets are built, namely, SOX, SOC2, Company General Access. After executing the process flow in FIG. 10 (i.e., the build), the resulting campaign datasets ready to be launched are shown in FIG. 12.

Thus, and as has been described, the technique of this disclosure provide metadata-driven entitlement selection based through the addition of properties (or, more generally, through additional data attached or otherwise associated with) governance objects such as applications, entitlements, access request workflows, and certification campaigns. The values for these properties may be populated in various ways, e.g., via business rule automation (described in more detail below), bulk loading, scripting or administrative interface. The entitlement selection metadata is then used by the identity governance system for improving maintainability, auditability, and scaling of the system. In one embodiment, and as entitlements are discovered from applications and endpoints, one or more business rules are applied to the metadata properties (e.g., regulatory classification of the application, whether the entitlement is privileged, whether the entitlement grants access to regulatory classified data, and the like). The nature and scope of the metadata, i.e., the particular "additional" data is customizable by the administrator and thus can be uniquely adapted to the user's security and compliance needs. The automated campaign generator (FIG. 6) determines when and which entitlements then need to be certified, e.g., based on the application, entitlement and attestation policy properties at issue. The system may also include or have associated therewith a certification campaign generator component that then launches a review campaign with the appropriate requirements at the appropriate time intervals. Campaign generator rules, e.g., "all users of entitlements classified as SOC2, to be launched in a semi-yearly campaign" or "role structure review of any role containing entitlements given access to data, to require NERC-CIP training," and so forth. These generator rules are merely exemplary of course.

Further, and as one skilled in the art will appreciate, the particular manner by which the metadata is defined and used to facilitate custom campaign dataset builds may be implementation-specific depending on the functionality of the underlying identity governance system or platform. For example, IBM Security Identity Governance and Intelligence implements so-called Advanced Rules. An Advanced Rule is an object that allows administrators to code complex behaviors that are then executed ad-hoc or at pre-defined schedules. Once configured, an Advanced Rule queries and gathers all objects (e.g., entitlements, applications and/or organizational units) based on one or even multiple-defined metadata objects. This functionality is used by the administrator to identify specific metadata that, once defined by the end-user, is then used to determine the dataset that will compose a specific audit campaign in the manner previously described. As noted, by allowing the user to define its own metadata information for each entitlement, application or even organization units, the technique provides the security team with the ability to define audit campaigns based on specific needs. For instance, if an organization requires that only selected SOX entitlements for multiple applications need to be part of a determined audit campaign, the administrator uses the Advanced Rules functionality to mark each entitlement or application with the corresponding metadata. Once the Advanced Rule is executed, the list of entitlements for each corresponding object is gathered as the dataset which, as noted above, is then used during audit campaign.

To provide a more concrete example, one of the most common regulations that enterprise (corporate) customers must comply with is SOX. In the typical scenario, it is common for the customer to have a pre-defined pool of entitlements or applications that are classified as SOX, and those are required to undergo specific audit campaigns. Once the entitlements are loaded on the solution, in the prior art the pre-defining of each entitlement and application that should be part of the audit campaigns poses significant challenge to the customer since they are required to maintain this "static" but mutable list (as permissions are always changing). By using the metadata approach herein to define that list, however, the customer pre-loads that information at the solution, defines by the Advanced Rule the metadata that will be used to classify the dataset, after which the dataset is gathered efficiently and reliably as and when needed for the compliance checking.

The nature of the compliance or security requirement in general or the particular audit campaign is not a limitation of this disclosure.

The subject matter described herein has significant advantages over the prior art. Using the approach, administrators have the ability to define and manage complex attestation requirements within the identity governance framework. Campaign content and review are more centralized and auditable, and the approach provides for increased accuracy of the review approvals and revocations within a particular campaign. The approach significantly reduces the burden of review and, in particular, by ensuring that only the entitlements required to be certified are included in the campaign dataset and can be reviewed on a less-frequent basis without impacting a compliance or security requirement. The campaign dataset automation technique reduces administrative burden, and it facilitates the creation and use of automated processes to ensure that an organization can stay current despite new and changing regulations.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. In particular, the "suspend and recertify" configuration tool, the administration page, or the workflow functions (or components thereof) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the administrator configurator and the dataset generation or other workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The nature of the campaign against which the database of entitlements is executed (e.g., evaluated) may vary. As described above, a typical campaign is a certification campaign, also sometimes referred to as an audit campaign, an access review, an attestation campaign, and the like. Typically, a certification campaign refers to a period of time when reviews of governed objects need to be completed. A certification campaign can be for many purposes, user access, account ownership, entitlement definition, organizational structures and policies such as SoD and risk mitigation.

The term metadata as used herein has been shown by several examples, although these examples should not be taken to be limiting. Generalizing, and as used herein, metadata is any data that is used to describe and/or add additional information to other data.

The techniques herein provide for improvements to another technology or technical field, namely, identity access and management systems, as well as improvements to the functioning of certification processes within such systems.

Having described the subject matter herein, what we claim is as follows:

1. A method to automate building and use of a dataset in a governance system having an organization entity-structured data model, comprising:
receiving configuration data defining information of interest for an audit campaign;
responsive to receipt of the configuration data, augmenting the data model to support user- or system-defined metadata that extends a governance data object of the data model to reference additional data that defines the audit campaign;
responsive to a request to generate the audit campaign, dynamically building a dataset of entitlements associated with the audit campaign using the augmented data model, wherein as defined by the user- or system-defined metadata, the dataset is built by retrieving the additional data from one or more data sources and customizing the governance data object in accordance with the retrieved additional data, and wherein the dataset is built by iterating through each of a set of applications in the governance system and, for at least one application in the set, retrieving the additional data from the one or more data sources and associating the retrieved additional data to the governance data object; and
executing the audit campaign against the dataset.

2. The method as described in claim 1 wherein the governance data object is an application properties data object that has an associated entitlement properties data object.

3. The method as described in claim 2 wherein the additional data is a permission associated with the governance data object.

4. The method as described in claim 2 wherein the additional data is maintained externally to the governance data object and is retrieved during building of the dataset.

5. The method as described in claim 1 further including updating the data model to include additional data objects.

6. The method as described in claim 1 wherein the audit campaign is a certification campaign that determines whether particular users continue to have access rights with respect to given resources in the organization.

7. An apparatus, comprising:
a processor;
computer memory holding computer program instructions executed by the processor to automate building and use of a dataset in a governance system having an organization entity-structured data model, the computer program instructions comprising program code configured to:
receive configuration data defining information of interest for an audit campaign;
responsive to receipt of the configuration data, augment the data model to support user- or system-defined metadata that extends a governance data object of the data model to reference additional data that defines the audit campaign;
responsive to a request to generate the audit campaign, dynamically build a dataset of entitlements associated with the audit campaign using the augmented data model, wherein as defined by the user- or system-defined metadata, the dataset is built by retrieving the additional data from one or more data sources and customizing the governance data object in accordance with the retrieved additional data, and wherein the dataset is built by iterating through each of a set of applications in the governance system and, for at least one application in the set, retrieving the additional data from the one or more data sources and associating the retrieved additional data to the governance data object; and
execute the audit campaign against the dataset.

8. The apparatus as described in claim 7 wherein the governance data object is an application properties data object that has an associated entitlement properties data object.

9. The apparatus as described in claim 8 wherein the additional data is a permission associated with the governance data object.

10. The apparatus as described in claim 8 wherein the additional data is maintained externally to the governance data object and the program code is further configured to retrieve the additional data during building of the dataset.

11. The apparatus as described in claim 7 wherein the program code is further configured to update the data model to include additional data objects.

12. The apparatus as described in claim 7 wherein the audit campaign is a certification campaign that determines whether particular users continue to have access rights with respect to given resources in the organization.

13. A computer program product in a non-transitory computer readable medium for use in a data processing system, the computer program product holding computer program instructions which, when executed by the data processing system, automate building and use of a dataset in a governance system having an organization entity-structured data model, the computer program instructions comprising program code configured to:
receive configuration data defining information of interest for an audit campaign;
responsive to receipt of the configuration data, augment the data model to support user- or system-defined metadata that extends a governance data object of the data model to reference additional data that defines the audit campaign;
responsive to a request to generate the audit campaign, dynamically build a dataset of entitlements associated with the audit campaign using the augmented data model, wherein as defined by the user- or system-defined metadata, the dataset is built by retrieving the additional data from one or more data sources and customizing the governance data object in accordance with the retrieved additional data, and wherein the dataset is built by iterating through each of a set of applications in the governance system and, for at least one application in the set, retrieving the additional data from the one or more data sources and associating the retrieved additional data to the governance data object; and
execute the audit campaign against the dataset.

14. The computer program product as described in claim 13 wherein the governance data object is an application properties data object that has an associated entitlement properties data object.

15. The computer program product as described in claim 14 wherein the additional data is a permission associated with the governance data object.

16. The computer program product as described in claim 14 wherein the additional data is maintained externally to the governance data object and the program code is further configured to retrieve the additional data during building of the dataset.

17. The computer program product as described in claim 13 wherein the program code is further configured to update the data model to include additional data objects.

18. The computer program product as described in claim 13 wherein the audit campaign is a certification campaign that determines whether particular users continue to have access rights with respect to given resources in the organization.

* * * * *